Feb. 5, 1924.
F. L. EIDMANN
1,482,429
ELEVATING TRUCK
Filed Aug. 4, 1919
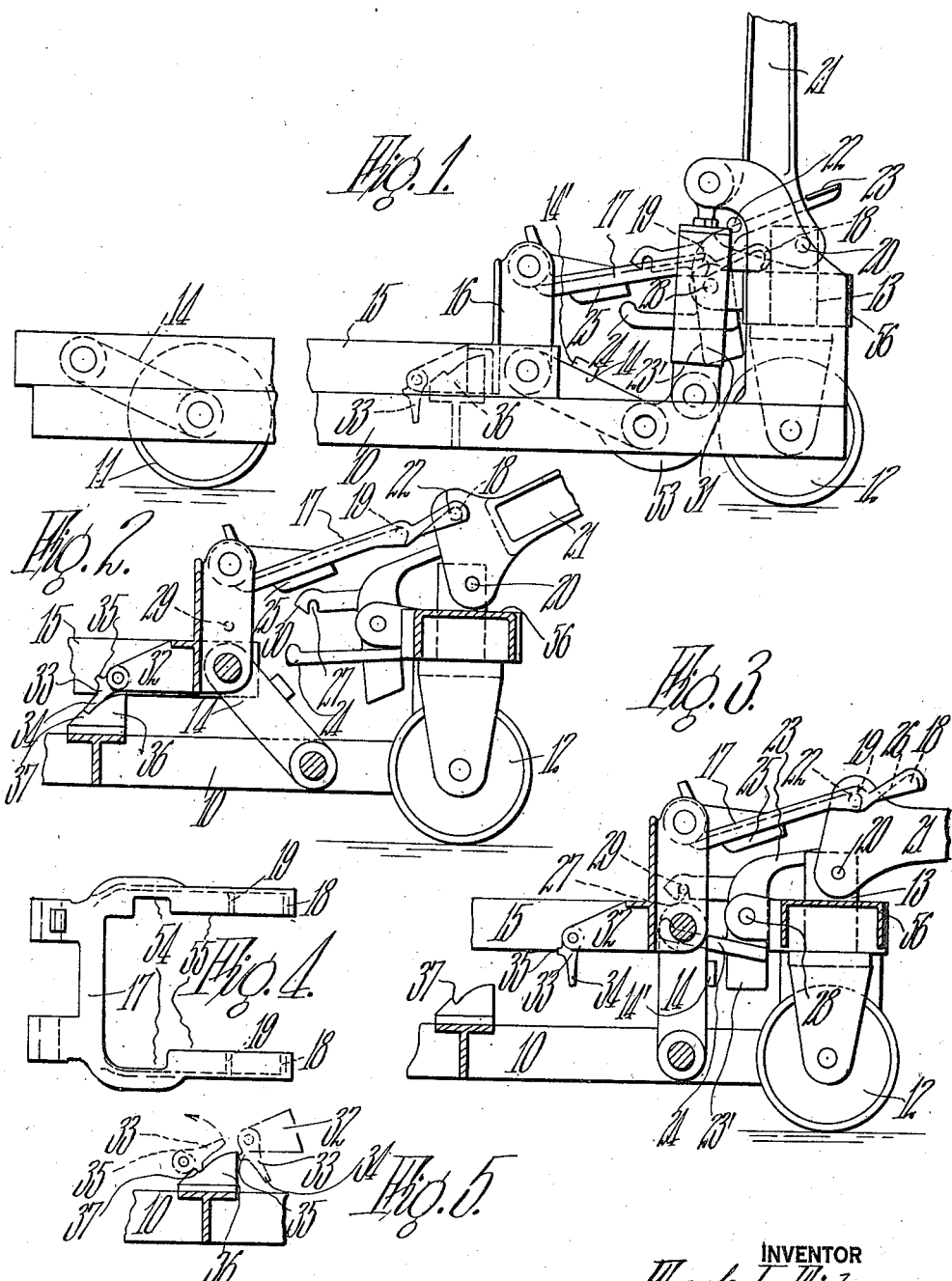
INVENTOR
Frank L. Eidmann
BY
Chapin + Neal
ATTORNEYS.

Patented Feb. 5, 1924.

1,482,429

UNITED STATES PATENT OFFICE.

FRANK L. EIDMANN, OF HOLYOKE, MASSACHUSETTS, ASSIGNOR TO J. LEWIS WYCKOFF, EDWARD N. WHITE, AND GEORGE F. JENKS, ALL OF HOLYOKE, MASSACHUSETTS, TRUSTEES.

ELEVATING TRUCK.

Application filed August 4, 1919. Serial No. 315,286.

*To all whom it may concern:*

Be it known that I, FRANK L. EIDMANN, a citizen of the United States, residing at Holyoke, county of Hampden, and State of Massachusetts, have invented certain new and useful Improvements in Elevating Trucks, of which the following is a specification.

My invention relates to elevating trucks of the type comprising a lower base frame having an upper frame or platform mounted thereon for up and down movement, which movement is effected by a pivoted handle, so that loads may be conveniently lifted, carried about and deposited where desired.

It has for its object a truck of the above type which is particularly adapted for use with very heavy loads, and in which the elevation of the platform is accomplished by a plurality of swinging movements of the pivoted handle, thus reducing the amount of work necessary to be done on each movement. It has for a further object the provision of novel latching mechanism for holding the platform in its partially elevated position; and of means for preventing the operation of such latching mechanism during the descending movement of the platform.

To these ends the preferred embodiment of my invention is constructed as shown in the accompanying drawings, in which—

Fig. 1 is a side elevation, the platform being shown in its lowered position;

Fig. 2 is a longitudinal section of the truck, the platform being shown in its partially elevated position;

Fig. 3 is a view similar to Fig. 2 showing the platform in its completely elevated position;

Fig. 4 is a detail of an elevating link; and

Fig. 5 is a detail showing the operation of the pawl for holding the platform in its partially elevated position.

The truck comprises a base frame 10, and upright head 56, which is supported at its rear end by a pair of wheels 11, and at its front end by a wheel 12 carried on a wheel fork having a king-pin 13 journaled in the head 56. Supported on a plurality of links 14, forming a parallel motion, is an elevating platform 15. At the front end of the platform is a bracket 16 having pivoted therein a forked link 17. This link has a plurality of hooks 18 and 19 (two in the embodiment shown) on each fork thereof. As shown in Fig. 4 the side arms of the forked link 17 have overhanging flanges 55 upon the underside of which the hooks 18 and 19 are formed. The flanges 55 are cut away as indicated at 54 for a purpose to be described.

Pivoted at 20 to the king-pin 13 is a handle 21 of the usual type, having a pin 22 projecting on both sides thereof. This pin successively engages hooks 18 and 19, as the handle is swung forwardly, in successive strokes and raises the platform on links 14. In order to cause the preliminary engagement of the pin 22 with hook 18 a treadle 23 is pivoted to the head 56 at 28 and provided with an arm 24 adapted to engage a lug 25 on link 17 to raise the same. With the parts in position as shown in Fig. 1, if the handle is swung slightly forwardly and the treadle depressed, link 17 will be raised so that a reverse movement of the handle will carry pin 22 under the hook. On releasing the treadle and swinging the handle forwardly again the platform will be partially elevated, as shown in Fig. 2.

When partial raising of the load is accomplished, the platform is held against retrograde movement by means about to be described, and the handle may be swung back again to its vertical position. In this movement pin 22 slides along an inclined path 26 on the underside of the flanges 55 and between hooks 18 and 19, until finally engaged by the hook 19. The handle may be then swung forwardly a second time, carrying the platform from the position of Fig. 2 to that of Fig. 3. The platform is then held in its completely elevated position by a latch arm 27 attached to the treadle 23 engaging a pin 29 secured to the bracket 16. Preferably the latch arm 27 has an inclined portion 30 at its rear end serving to raise the arm on the approach of the pin to permit of its engagement therewith.

The treadle 23 is preferably provided with an integral depending arm 23' adapted to abut against the boss 14' of a link 14 and force the link to swing backwardly for starting the platform on its descending movement when the treadle is depressed. When it is desired to lower the platform the treadle 23 is depressed and it will be noted that the latch 27 is disengaged from the pin 29 slightly before the arm 23′ abuts against the boss 14′ of link 14 to start the platform down.

The descent of the platform may be controlled by any suitable checking device. In the present embodiment, I have shown a hydraulic check 31 pivotally connected at its upper end 50 to a bracket 51 of the main frame, and at its lower end 52 to a crank extension 53 of one of the links 14. This particular checking device forms the subject matter of a separate application issued as Patent No. 1,415,926, May 16, 1922.

The means for holding the platform against retrograde movement during the partial elevation thereof, is in the present embodiment of my invention, constructed as follows: Pivoted to a bracket 32 on platform 15 is a freely swinging pawl 33, provided with a nose portion 34 and with a reversing lug 35. Secured to the frame is a member 36 having a shoulder 37 adapted for engagement successively with the nose portion and the reversing lug of the pawl.

The operation of the improved truck will now be described. Starting with the parts in the position of Fig. 1, hooks 18 are brought into engagement with pin 22 as set forth above, and handle 21 is swung forwardly, raising the platform to the position of Fig. 2. During this movement pawl 33 drags over member 36, and at the termination of the partial elevation of the platform the nose portion will engage shoulder 37, as appears in Fig. 2. Handle 21 is then swung rearwardly to cause engagement of pin 22 with hooks 19, and is finally moved forwardly again to complete the raising of the platform. When the platform is fully elevated it is held by the latch 27 as described, and pawl 33 swings freely as shown in Fig. 3.

In this position of the parts however the pin 22 of the handle still lies beneath the overhanging flanges 55 of the forked link 17. The handle is then raised or thrown back from the position shown in Fig. 3 until the pin 22 rides free of the overhanging flanges 55 into the cut away portions or clearance portions 54 where upon the forked link 17 drops by gravity or spring if desired to rest upon the frame head 56. The handle 21 is now clear of any obstruction and may be freely manipulated to steer and draw the truck.

When the platform is lowered the pawl will drag over member 36 as shown in Fig. 5, but will have its nose portion pointing in the opposite direction from that necessary to cause engagement between the nose portion and the shoulder. To insure the proper positioning of the pawl prior to the next elevation of the platform the reversing lug 35 is provided. As the platform descends this lug is brought into sharp engagement with the shoulder 37, flipping the pawl over in the direction of the arrow (Fig. 5) thus bringing the pawl to the original position of Fig. 1. The pawl 33 is then in proper position to perform its holding function upon the next partial raising of the platform.

While I have shown and described a preferred manner for carrying my invention into practice, I do not wish the same to be limited to the exact embodiment shown, for it is understood that various changes may be made within the scope of my invention as claimed.

I claim—

1. In an elevating truck, running wheels, a platform mounted for elevating movement thereon, means for elevating the platform in successive steps, and means for holding the platform against retrograde movement between said steps, said last named means being constructed and arranged to automatically become inoperative when the platform reaches its maximum elevation.

2. In an elevating truck, a base, a platform mounted for elevating movement thereon, means for elevating the platform in successive steps, and means for holding the platform against retrograde movement between said steps comprising a pawl pivoted on the platform, a member on the base having a shoulder against which the pawl rests between the said steps, said member being shorter than the length of travel of the pawl, whereby the pawl is released when the platform is elevated to its maximum elevation.

3. In an elevating truck, a base, a platform mounted for elevating movement thereon, means for elevating the platform in successive steps, and means for holding the platform against retrograde movement between said steps comprising a pawl pivoted on the platform, a member on the base having a shoulder against which the pawl rests between the said steps, said member being shorter than the length of travel of the pawl, whereby the pawl is released when the platform is elevated to its maximum elevation and a lug on the pawl adapted to engage the said shoulder on the lowering movement of the platform to return the pawl to its platform-holding position.

4. In an elevating truck in combination, running wheels, a platform mounted for elevating movement thereon, a pivoted steering handle for said truck, means for elevating said platform in a step by step manner by the successive swinging of said handle, comprising a link for effecting a direct connection between said handle and said platform during the swinging movements of said handle in one direction, said connection being interrupted during the swinging movements of the handle in the other direction and means for holding the platform stationary in its partially elevated position during the interruption of said connection.

5. In an elevating truck in combination, running wheels, a platform mounted for elevating movement thereon, a pivoted steering handle for said truck, means for elevating said platform in a step by step manner by the successive swinging of said handle, comprising a link for effecting a direct connection between said handle and said platform during the swinging movements of said handle in one direction, said connection being interrupted during the swinging movements of the handle in the other direction, means for holding the platform in its partially elevated position during the interruption of said connection, said holding means becoming automatically inoperative to check the descent of said platform when the frame reaches its uppermost position.

6. In an elevating truck in combination, running wheels, a platform mounted for elevating movement thereon, a pivoted steering handle for said truck, means for elevating said platform in a step by step manner by the successive swinging of said handle, comprising a link for effecting a direct connection between said handle and said platform during the swinging movements of said handle in one direction, said connection being interrupted during the swinging movement of the handle in the other direction, means for holding the platform in its partially elevated position during the interruption of said connection, said holding means becoming automatically inoperative to check the descent of said platform when the platform reaches its uppermost position and automatically reset when the frame reaches its lowermost position to hold said frame when raised to a partially elevated position.

7. In an elevating truck, running wheels, a platform mounted for elevating movement thereon, means for elevating the platform in successive steps, and means for holding the platform against retrograde movement between said steps, said last-named means being constructed and arranged to automatically become inoperative when the platform reaches its maximum elevation, and means for automatically restoring said platform holding means to operative condition when the platform has reached its lowermost position.

8. In an elevating truck, running wheels, a platform mounted for elevating movement thereon, means for elevating the platform in successive steps, means for holding the platform against retrograde movement between said steps, means separate from the last named means for holding the platform in its completely elevated position, said first-named holding means being constructed and arranged to remain inoperative during the lowering of the platform from its maximum elevation, and means for automatically restoring said platform holding means to operative condition when the platform has reached its lowermost position.

9. In an elevating truck, a base, a platform for elevating movement thereon, means for elevating the platform in successive steps, and means for holding the platform against retrograde movement between said steps comprising, a pawl pivoted upon the platform, a ratchet member on the base for co-acting with said pawl and arranged to become automatically disengaged from the pawl when the platform is raised to its highest position and means for automatically restoring said pawl to its platform holding position when the platform is lowered to its lowest position.

10. In an elevating truck, a base, a platform for elevating movement thereon, means for elevating the platform in successive steps, and means for holding the platform against retrograde movement between said steps comprising, a pawl pivoted upon the platform, a ratchet member on the base for co-acting with said pawl and arranged to become automatically disengaged from the pawl when the platform is raised to its highest position and means for automatically restoring said pawl to its platform holding position when the platform is lowered to its lowest position, said means comprising a lug on the pawl and a shoulder on the base to engage said lug during the lowering movement of the platform.

11. In an elevating truck, running wheels therefor, a platform mounted for elevating movement thereon, means for elevating the platform in successive steps, means for holding the platform against retrograde movement between said steps, comprising a pawl and ratchet mechanism, and arranged to automatically disengage the pawl from the ratchet when the platform reaches its highest position and means to automatically return said pawl to its holding relation with respect to said ratchet when the platform reaches its lowest position.

12. In an elevating truck, running wheels therefor, a platform mounted for elevating movement thereon, means for elevating the platform in successive steps, means for holding the platform against retrograde movement between said steps, comprising a pawl and ratchet mechanism in which the pawl has a relative movement with respect to said ratchet during the raising and lowering of the platform, the ratchet being shorter than the relative travel of the pawl so as to become automatically disengaged therefrom when the platform reaches its highest position and means to automatically return said pawl to its holding relation with respect to said ratchet when the platform reaches its lowest position.

13. In an elevating truck in combination, running wheels, a platform mounted for elevating movement thereon, a pivoted steering handle for said truck, means for elevating said platform in a step by step manner by the successive swinging movement of said handle, comprising a link pivoted to one of said parts and having a plurality of hooked portions and an engaging portion fixed on the other of said parts adapted to ride on said link for successive engagement with said hooked portions as the handle is swung successively to elevate the platform and means to hold the said platform stationary between the successive engagements of said hook portions.

14. In an elevating truck in combination, running wheels, a platform mounted for elevating movement thereon, a pivoted steering handle for said truck, means for elevating said platform in a step by step manner by the successive swinging movement of said handle, comprising a link, having a plurality of downwardly facing hooks and an operating member adapted to ride beneath said link for successive engagement with said hooks as the handle is swung successively to elevate the platform and a clearance portion on said link to permit said link to drop by gravity free of said operating member when the handle is swung backwardly after elevating said platform.

15. In an elevating truck in combination, running wheels, a platform mounted for elevating movement thereon, a pivoted steering handle for said truck, means for elevating said platform in a step by step manner by the successive swinging of said handle, comprising a link for effecting a direct connection between said handle and said platform during the swinging movements of said handle in one direction, said connection being interrupted during the swinging movements of the handle in the other direction, and a latch operable independent of said handle for holding the platform stationary in a partially elevated position during the interruption of said connection.

FRANK L. EIDMANN.